United States Patent
Heckman et al.

[15] 3,703,208
[45] Nov. 21, 1972

[54] REDUCTION OF RADIOACTIVE GAS CONTAMINATION OF NUCLEAR DETONATIONS IN GEOLOGICAL FORMATIONS

[72] Inventors: Richard A. Heckman, Castro Valley; John O. Cowles, Livermore, both of Calif.

[73] Assignee: The United States of America as represented by the United States Atomic Energy Commission

[22] Filed: Jan. 22, 1971

[21] Appl. No.: 108,976

[52] U.S. Cl. .................................................. 166/247
[51] Int. Cl. ............................................... E21b 43/00
[58] Field of Search ............................... 166/247, 63

[56] References Cited

UNITED STATES PATENTS 3,608,636  9/1971  Dixon ........................ 166/247

OTHER PUBLICATIONS

A-Blast Set for Peace Use Test, Nov. 12, 1958, Washington Post and Times Herald
Frank W. Stead, Tritium Distribution in Ground Water Around Large Underground Fusion Explosions, Nov. 1963, pp. 1163-1165, Science, Vol. 142.
World Oil, September 1969, Project Pulison, pp. 67-71

*Primary Examiner*—Robert L. Wolfe
*Attorney*—Roland A. Anderson

[57] ABSTRACT

Oxidizing agents are disposed circumjacent to a nuclear explosive device detonated in a geological formation, generally a carbonaceous or petroliferous formation, to provide a more oxidizing environment thereabout. Upon detonation of the device reductants present in the formation as well as in emplacement components are oxidized. Consequently tritium produced by the detonation together with any hydrogen gas present tends to be oxidized to form a tritiated water product. The water combines with inorganic materials in the vicinity of the detonation and is immobilized or falls to the bottom of the detonation produced cavity so as to minimize the tritium content of organic materials evolved by the formation.

7 Claims, No Drawings

3,703,208

REDUCTION OF RADIOACTIVE GAS CONTAMINATION OF NUCLEAR DETONATIONS IN GEOLOGICAL FORMATIONS

BACKGROUND OF THE INVENTION

The invention disclosed herein was made in the course of, or under, Contract No. W-7405-ENG-48 with the United States Atomic Energy Commission.

In utilizing nuclear detonations for various underground engineering applications a major concern is the possible release or venting of radioactive products to the surface environment. It has generally been considered that most of the radioactive products produced in such detonations would be trapped as non-volatile or insoluble constituents in solidified melt zone material produced in the formation in the vicinity of the detonated device. The immobilization of such radioactive products does appear to occur in many applications with detonations conducted in certain formations. However, in many other cases, gaseous radioactive products appear in undesirable or hazardous amounts as a contaminant in fluid and gaseous materials evolved or transported through the chimney created in the formation by the detonation.

Contamination of fluid and especially of gaseous hydrocarbons by tritium produced in such detonations is of particular concern where nuclear detonations are to be used for stimulating production of gaseous and fluidic hydrocarbons from petroliferous formations. Domestic reserves of natural gas in known deposits having permeabilities and other characteristics permitting economically feasible production are rapidly becoming inadequate to supply ever increasing demands. Very large reserves of natural gas and other petroleum hydrocarbons exist in formations of great thicknesses which either have too low a permeability for economic production by conventional techniques or which contain the hydrocarbon in a form not recoverable by conventional methods. Various methods have been proposed wherein nuclear explosives are detonated in such formations to increase the effective permeability or to otherwise prepare the formation for hydrocarbon recovery. Two nuclear detonation experiments, i.e., Gasbuggy and Rulison have been conducted in thick, low-permeability ("tight") hydrocarbon reservoirs with a consequent stimulation of natural gas production as disclosed, for example, in "Proceedings of the Symposium on Engineering with Nuclear Explosives"Jan. 14–16, 1970, Las Vegas, Nev., issued May 1970. When a nuclear explosive is detonated in such a formation as well as in certain other underground nuclear detonation environments, there is first produced a generally spherical chamber including a large amount of melted material which may temporarily line the chamber and portions of which may thereafter form a puddle in the lower portion of the chamber. Later, the upper portion of the chamber may cave progressively forming a chimney in the formation which chamber together with the chimney and the associated fracture system comprise the principal means whereby the formation permeability is increased. The melted formation portions are often termed the "melt" zone which on cooling and solidifcation forms a rather insoluble vitreous or glass-like substance in which radioactive detonation products are to a large extent trapped.

In usual practice it has been considered that fission yield devices may be used in preference to fusion devices to minimize tritium generated in the device itself; however, this would increase the cost of the explosive and, even with pure fission explosives, significant amounts of tritium are produced by neutrons emanating therefrom and interacting generally with lithium present in the rock. The tritium which is produced is, of course, in a gaseous state and intermixes with the gases formed in the detonation and thereafter with natural gas, fluid hydrocarbons, or water which enter the chimney from the formation, e.g., during product withdrawal. Moreover, the tritium can undergo exchange reactions with the hydrogen of the gaseous or fluid hydrocarbons providing tritiated compounds which together with the gaseous tritium cannot be easily or economically separated from such hydrocarbons. The tritium gas and tritiated gas content creates a hazard, e.g., when the hydrocarbons are burned especially in household devices since the tritiated water produced can be inhaled to enter the body. Accordingly, it is readily apparent that a need exists by which tritium contamination of products including gaseous and fluidic hydrocarbons extracted from nuclear detonation environments can be minimized.

SUMMARY OF THE INVENTION

The invention relates, generally, to procedures for reducing radioactive contamination of fluid and gaseous materials by underground nuclear detonations and, more particularly, to a procedure for minimizing contamination of fluid and gaseous hydrocarbons by tritium produced incident to detonation of a nuclear explosive in a petroliferous formation.

Tritium contamination can arise in the vicinity of a nuclear explosive device detonated in a geological formation from several sources. With pure fission devices excess neutrons emanating from the device can induce reactions with lithium in the formation to produce tritium. With other types of nuclear explosives, e.g., conventional fission-fusion devices even more tritium can originate from the components of the device and from the high energy, i.e., 14 Mev neutrons produced therein interacting with lithium and boron nuclei which are present in at least trace amounts in most geological formations. The amount of tritium produced accordingly depends upon the type of nuclear explosive employed, the yield of the explosive and the content of fertile materials in the formation which may react with neutrons to produce tritium. The tritium from whatever source is generally in an atomic state which may combine with hydrogen to form HT molecules or with organic hydrocarbons by abstraction reactions to form tritiated gaseous or fluid hydrocarbons, thereby contaminating in situ materials. If the gaseous portions of the chimney contents should vent to the atmosphere or if the products, e.g., gaseous hydrocarbons are withdrawn for use as for fuel, the tritium may present a serious hazard to humans and to the ecological system.

Based on various observations and studies it is now considered that tritium in a gaseous contaminating state is produced where conditions are such that a high temperature chemically reducing environment is provided particularly in the melted zone surrounding the shot location in the chamber produced by the detonation. Reducing conditions in the gas phase may arise from the products of reactions of naturally occurring materials such as water, with materials such as iron and/or other metals used in emplacement casings and canisters, plastic components, etc. Materials which can function as reducing agents such as hydrocarbons and especially free carbon or carbon compounds having a high ratio of carbon to hydrogen, e.g., bituminous shale, coal, kerogen, etc., may exist in the formation itself. It will be appreciated that the latter conditions will often prevail in petroliferous formations from which it may be desired to produce or extract gaseous and fluidic hydrocarbon products.

Generally speaking the present invention relates to a technique wherein reagents which provide an oxidizing environment in at least the melt zone created by the detonation are disposed in proximity to and preferably surrounding the device during emplacement. It is generally preferred to utilize a minimum of components and materials which would create or augment a chemically reducing effect in the construction of emplacement components, drill casing, etc. It is also contemplated that emplacement may often be made in particular interbedded strata of the formation in which minimum amounts of reducing agent components or increased proportions of oxidizing components are present so as to minimize the quantity of oxidizing agent required to effectively entrap the radioactive contaminants.

With such an arrangement, on detonation of the nuclear explosive, the oxidizing agents are heated to a high temperature to melt and intimately intermix with at least the portions of the formations which are simultaneously melted by the detonation to provide a quantity of oxidizing agent therein. The oxidizing agents accordingly react with reductants present therein as well as with a major portion of the tritium produced in the rock surrounding the device and/or which is released from the device to produce condensible products such as tritiated water (HTO) molecules. The tritiated water molecules along with other water produced by combustion or released from the formation on heating then will partially combine with various constituents of the formation as water of hydration, e.g., in silicates, as water of crystallization, or to form hydrous oxides, hydroxides and otherwise to be incorporated into solid substances in the detonation chamber thereby being effectively immobilized therein. In this form it may be noted that the tritium cannot readily undergo exchange reactions with the fluid and particularly with gaseous hydrocarbons present in the detonation chamber. Sufficient quantities of the oxidizing agent are incorporated to assure that the various reaction equilibria are driven to an oxidative state where little or no gaseous tritium isotope remains in the gas phase in the chamber. Whatever water vapor containing HTO which is not effectively absorbed or incorporated by solid substances in the chamber and is entrained in the gaseous or fluid hydrocarbons withdrawn from the chamber may be removed at the surface or by conventional drying operations such as by condensation, dehydration, etc., to further decontaminate the products.

Accordingly, it is an object of the invention to provide a method by which radioactive contamination of in situ gaseous and fluid products by a subterranean nuclear explosive detonation is minimized or prevented.

Another object of the invention is to provide a process wherein a nuclear detonation in a geological formation is conducted in a chemically oxidizing environment to minimize contamination of extractable fluid and gaseous materials with radioactive substances.

Still another object of the invention is to provide a process wherein a nuclear explosive device is emplaced in a subterranean petroliferous formation and oxidizing reagents are disposed in proximity or in surrounding relation thereto so that on detonation of the device an oxidizing environment is provided at least in the chamber and melted rock zone formed by the detonation so that radioactive contaminants including at least tritium are converted to an oxidized form which can be entrapped by solids in the detonation chamber or which are in an economically removable form in gaseous materials therein.

Other objects and advantageous features of the invention will be apparent in the following description of the invention.

DESCRIPTION OF THE INVENTION

It is considered that the process of the invention may generally be applied in locales having an excess of reducing agents comprising materials in the geological formation and emplacement components formed of chemically reducing materials such as iron and hydrogenous materials from which gaseous hydrogen or hydrocarbons may evolve. However, for illustrative purposes the process of the invention will be described as applied to nuclear detonations conducted in a typical, low-permeability petroliferous formation or reservoir for stimulating production of organic hydrocarbons therefrom. Domestic deposits as well as known foreign deposits occur in areas covering tens of thousands of square miles and may include several thousand feet of continuous or contiguously interbedded strata containing, for example, significant quantities of natural gas in small poorly interconnected pores. These strata generally are sedimentary in nature and comprise varying proportions of sands, clay, carbonate rocks such as limestone and dolomite, minerals such as $Fe_2O_3$, limonite, tarry or coal like particles of low hydrogen to carbon ratio hydrocarbons, fluid hydrocarbons and other materials in addition to methane and other gaseous hydrocarbons.

For emplacing a nuclear explosive in such a formation, to provide a detonation effective to stimulate production therefrom, a cased or uncased borehole as appropriate may be constructed as in conventional petroleum production practice or as in underground nuclear testing, i.e., in the manner utilized in "Gasbuggy" and "Rulison" natural gas stimulation experiments disclosed in the aforesaid "Proceedings"see also, "Emplacement and Stemming of Nuclear Explosives for Plowshare Applications"J. L. Cramer, pp. 974, of the above-referenced Proceedings. Other emplacement methods may also be used, e.g., by means of mine shaft or horizontal borehole in shallow petroliferous deposits particularly where gas pressure may be low or non-existent.

To accommodate the required amounts of oxidants the site at which the explosive device is to be emplaced may be enlarged as by reaming or overboring, by using a conventional explosive "camoufletting" technique or other effective bore enlarging technique as appropriate under the circumstances. It is preferred that the site of the emplaced explosive be selected to be in a stratum having a minimum content of reducing materials, e.g., barren sand, clayey sandstone, clay bed or the like which may be interbedded, e.g., as a lens between or adjacent to the hydrocarbon strata from which production is to be stimulated. The emplacement well may be drilled somewhat deeper than the level of emplacement and solid, e.g., granular oxidant disposed therein preferably as near the explosive device as possible but not at a distance which exceeds the expected detonation chamber radius. The nuclear device disposed in the usual emplacement canister with attached control cable and supporting means may then be lowered and positioned at the selected detonation site. Additional oxidant may then be positioned in the enlarged borehole portion surrounding the detonation site and upwardly in the borehole to chamber dimensions. Easily decomposed oxidant could be placed in the borehole to a height corresponding to the expected chimney dimensions to provide a late time oxidizing effect on chimney gases. Other procedures can be used to position the oxidant in surrounding relation to the explosive. For example, a dense aqueous slurry or suspension using, e.g., bentonite suspension agents could be positioned in a manner similar to that used in concreting or grouting of well casing, e.g., by perforating the casing and pumping the slurry or suspension outwardly into pores and fractures in the formation. Fluid and/or gaseous oxidants could be emplaced in a similar manner. Following emplacement of the oxidant the borehole is stemmed and sealed in any appropriate manner, e.g., as in the "Gasbuggy" and "Rulison" experiments. (c.f. pp. 597 of said "Proceedings")

The amount of oxidant which is used should be sufficient to combine with all reducing materials in at least the emplacement components as well as in the melt zone expected to be produced by the detonation. It is preferred that there be employed an excess sufficient to assure that substantially no free hydrogen gas, i.e., $H_2$, HT, etc., remains in the gaseous atmosphere in the cavity and chimney. The amount of oxidant required may accordingly be determined as that required on stoichiometric principles to oxidize all reducing materials in the melt zone which may be considered to include all portions of the formation heated sufficiently to ignite the reductants. To assure complete oxidation and therefore avoid formation of any volatile hydrogen containing products, other than possibly a small amount of tritiated water vapor, an excess of oxidants may be used. Residual water vapor can be removed by dehydration procedures as described above to further lower the tritiated water from the gas withdrawn from the detonation chamber and chimney.

As reported in a paper entitled "Interpreting the Chemical Results of Gasbuggy Experiment" by R. W. Taylor et al, page 794 of said Proceedings, the principal reactions which occur when a nuclear explosive is detonated in a typical carbonate petroliferous formation, i.e., the Lewis shale are as follows:

1. $C + H_2O \rightarrow CO + H_2$
2. $C + CO_2 \rightarrow 2 CO$
3. $C + H_2O \rightarrow \frac{1}{2} CH_4 + \frac{1}{2} CO_2$
4. $CO + H_2O \rightarrow CO_2 + H_2$
5. $4H_2 + CO_2 \rightarrow CH_4 + 2H_2O$
6. $CO + 3H_2 \rightarrow CH_4 + H_2O$
7. $CO + H_2 \rightarrow \frac{1}{2} CH_4 + \frac{1}{2} CO_2$ It may be noted that in the Gasbuggy environment the reactions are generally reducing in nature with carbon almost exclusively serving as the primary reducing agent. From the Gasbuggy data reaction (1) appears to be the main reaction. Several of the reactions lead to the incorporation of hydrogen into gaseous hydrocarbons ($CH_4$). Tritium present in the melted zone reaction environment accordingly is incorporated by such chemical reactions and by exchange reactions into tritiated hydrocarbons which contaminate hydrocarbon products withdrawn from the reservoir.

For the purposes of the present invention the reducing agents which may be present will include carbon usually in a graphitic or amorphous form, lower aliphatic hydrocarbons such as $CH_4$, $C_2H_6$, $C_3H_8$, $C_4H_{10}$, etc., solid hydrocarbons, e.g., asphalts, paraffins, tars and other hydrocarbons of lesser proportionate hydrogen content than the paraffinic components and possibly containing sulfur and nitrogen. Metallic iron, hydrocarbon components, etc., of nuclear explosive emplacement components will also act as reducing agents under the conditions herein. With an oxidant present it is desired that the following type reactions be driven substantially to completion.

a. $C + O_2 \rightarrow CO_2$
b. $C_nH_{(2n+2)} + \frac{1}{2} O_{2(3n+1)} \rightarrow CO_{2(n)} + H_2O_{(n+1)}$
c. $C_nH_x + O_{2(2n+x/2)} \rightarrow CO_{2(n)} + H_2O_{(x/2)}$
d. $Fe + O_2 \rightarrow FeO$ (some $Fe_3O_4$ possibly)
e. (sulfides) + $O_2 \rightarrow$ (sulfates)

Under the indicated conditions reduction reactions of the type indicated above which can yield gaseous hydrogen containing HT are nearly eliminated. It will be noted that CO formation and the formation of hydrocarbons by reactions occurring in the detonation chamber are also minimized or eliminated during the explosion and high temperature cooling time periods. The tritium formed or released in the explosion is almost completely converted to tritiated water (HTO) dispersed in a very dilute admixture within vapor and/or condensed water phase. A substantial portion of the water eventually may combine with fused silicate and calcined carbonate rock, dolomite, calcite, etc., present in the explosion chamber and thereby the tritiated compounds may be immobilized to diminish the possibility of exchange reactions which could produce tritiated hydrocarbons with fluid or gaseous hydrocarbons withdrawn from the formation through the detonation chamber as described above.

Various oxidizing agents may be employed for the purposes of the invention. In the equations above, oxygen is shown as an illustrative example and may be used as high pressure gas pumped into the formation, if porous liquid oxygen, disposed in a cryogenic container might also be used to dispose at least a portion of the required oxidant in the well bore. However, it is generally preferred to utilize a solid oxidant such as manganese dioxide, sodium or potassium permanganate, alkaline earth or alkali metal chlorate, perchlorate, sulfate, nitrate, or other suitable nitrate compound, sodium perborate or sodium peroxide, which may conveniently be packed in the enlarged emplacement area as well as in adjacent well-bore or emplacement drift regions. Similarly fluidized, slurry or solution forms of the indicated oxidants may also be used, e.g., to facilitate injection into the formation proximate the detonation site. The latter may comprise aqueous solutions, slurries of finely-divided oxidant or an aqueous suspension of the oxidant which may be introduced into the formation using equipment of the type used for hydro-fracturing, or otherwise treating formations as commonly practiced in the art.

The amount of oxidant required may be calculated by analytically determining the content of reductants present in the formation. In certain petroliferous formations the carbon and hydrocarbon content may represent the reductants of major importance. Under other conditions, especially where hydrocarbon content is low such as formations of dolomite and calcite, ferrous sulfide may represent a major reductant. In the event iron is present in a hydrocarbon bearing formation, it will be found that the ratio of $Fe^{++}$ to $Fe^{+++}$ states will tend to be high. Sulfides, e.g., $FeS_2$, may also serve as reductants. Total iron content in petroliferous formations and other formations in which nuclear explosives may be used may range up to 5 wt % or more. Metallic iron, organic compounds and organic compositions used in emplacement components, canister and nuclear explosive device should also be taken into consideration and the amounts thereof should be minimized to lower oxidant requirements.

The technique of the invention may generally be employed in any environment wherein reductant materials are in stoichiometric excess over potential oxidizing components so that hydrogen forming reactions can occur on detonation. For example, the formation may contain carbon above 0.1 percent and/or similar amounts of hydrocarbon or other organic material therein. It will be appreciated that the present technique could, in theory, be utilized with large proportions of reductants in the formation and/or emplacement components. However, a practical economic limit of about 5 to 10 wt % of reductants may be imposed due to the amount of oxidant that would be required. Some decrease in the calculated quantity of oxidant required may be possible in the event that gaseous hydrocarbons are displaced outwardly in the formation by injected oxidizing agents, the fluid used to inject the oxidizing agent, or by explosion produced gases. Moreover, zoning of the melted material within additional material heated to a temperature high enough to burn the carbon and other reductants may permit, for example, 500 to 700 tons/kilotons of rock typically to be melted while the total heated to combustion temperature may be of the order of 1100 to 1200 tons/kiloton explosive yield including the melt zone. Dependent on the composition, water content and the like the amount of rock melted or otherwise heated sufficiently by the nuclear detonation to heat and burn or oxidize the reductants may range from about 400 metric tons/kiloton explosive equivalent to as high as about 1200 metric tons/kiloton (1 kiloton is equivalent to $10^{12}$ calories) (See " Proceedings" – pp. 794 reference ibid).

The amount of environmental reductant playing an active role in scavenging shot produced tritium may be limited by chemical reaction rate and/or heat and mass transfer rates. There may not be time for the chemical, physical, or thermal equilibration of tritium produced near the device with all the material heated by the detonation energy. Often the hot cavity produced by the detonation is thermally quenched by the rapid influx of colder materials occurring during cavity collapse. Upon collapse volatile materials may escape into the cold chimney region and not significantly interact thereafter with products from the hot materials near the detonation point. Thus the tritium emanating from the detonation may react with (1) only the approximately 100 tons/kiloton of rock vaporized by the shockwave from the detonation, (2) the roughly 300 total tons/kiloton initially melted by the shockwave, (3) the 700 or so total tons/kiloton melted when cold rock contacts the superheated shock melted rock or (4) the 1000 or so total tons/kiloton eventually heated sufficiently to react in situ free carbon with steam and carbon dioxide.

It is necessary that sufficient oxidant be provided to oxidize the reductants present in the melted rock, i.e., usually about 500 to 1200 metric tons/kiloton explosive equivalent as well as to account for emplacement components. Typically, the amount of molten rock produced may range from about 500 to 1200 metric tons per kiloton of explosive yield. Nuclear explosive yields in the range of 1 kiloton to 100 kilotons may be employed. For many petroliferous formations nuclear explosive yields in the range of about 5 to 100 kilotons are considered suitable with depths of burial ranging from about 2000 feet to about 15,000 feet which provide for fully contained detonations and as may be selected to provide for the required rock breakage, cavity and chimney volume or extent of fracturing desired. The detonation size may also be determined by seismic limits as disclosed in the copending application of Milo D. Nordyke for "Nuclear Explosive Method for Stimulating Hydrocarbon Production from Petroliferous Formations" filed Ser. No. 89,889, Nov. 16, 1970.

When nuclear explosives are detonated in the presence of oxidants as described a major proportion of the tritium, i.e., above 90 percent of that normally expected to appear in gaseous or hydrocarbon form, will instead be in the form of HTO and such form will largely be entrapped in an immobilized form within the formation debris. Whatever tritiated water vapor occurs in admixture with normal water vapor in gaseous hydrocarbons withdrawn from the cavity formed by the detonation can be removed therefrom by a conventional gas drying operation at the surface or by other techniques well known in the prior art.

Further details concerning operation of the technique of the invention will be apparent in the following illustrative example:

EXAMPLE

Information relating to the composition of a typical shale zone, the "Lewis" shale, in which a nuclear explosive has been detonated, i.e., the "Gasbuggy" operation, and various other parameters and details relating to such a typical operation are set forth in a paper entitled "Interpreting the Chemical Results of the Gasbuggy Experiment"pp. 794, et seq., of said "-

Proceedings" and references cited therein. Other information is set forth in "Gasbuggy Preshot Summary Report" (PNE-1001, 1967) U. S. Atomic Energy Commission.

EXAMPLE 1 — The Gasbuggy Situation

This example presents a calculation in which a nuclear detonation is fired in a relatively reductant rich environment. The conditions given are actual data derived from the Gasbuggy experiment.

TABLE I

Parameters of the Gasbuggy Experiment pertinent to present technique:

| | |
|---|---|
| Device Yield | 26 kilotons |
| Cavity Radius | 80 ft |
| Rock Heated to Reactive Temperatures (1100 tons/kiloton) | 28,600 metric tons |
| Reactive Materials in Rock (Lewis Shale) | |
| Free Carbon (0.5 wt %) | 143 metric tons |
| $FeS_2$ (0.8 wt %) | 228 metric tons |
| $Fe_2O_3$ (3 wt %) | 858 metric tons |
| FeO (1 wt %) | 286 metric tons |
| Hydrocarbons (0 wt %) | 0 metric tons |

Reactive Materials in Emplacement Hole Cavity Region

| | |
|---|---|
| Device Canister | 1 ton iron |
| Emplacement Hole Casing (140 ft at 160 lb/ft) | 11 tons iron |
| Emplacement String (80 ft at 25 lb/ft) | 1 ton iron |

TABLE II

Thermodynamic Properties pertinent to present technique

Free Energy of Formation Kcal/gram atom oxygen

| Oxide | Temperature | |
|---|---|---|
| | 1000° K | 1500° K |
| $SO_2$ | −34 | −31 |
| $Fe_2O_3$ | −45 | −35 |
| $H_2O$ | −47 | −38 |
| FeO | −47 | −39 |
| $CO_2$ | −48 | −48 |
| CO | −47 | −58 |

Table 2 indicates the relative oxidizibility of the elements sulfur, iron, carbon and hydrogen over the range of temperatures encountered at late times in nuclear cavities. The least stable oxides are at the top of the table. Before a given oxide can be formed, sufficient oxidizer must be provided to form the oxides below it in Table 2. For the purpose of reducing undesirable tritium compounds we shall provide enough oxidizer to form $CO_2$ and FeO which prevents the following reactions from occurring:

$$Fe + H_2O \rightarrow FeO + H_2$$

$$C + H_2O \rightarrow CO + H_2$$

$$CO + H_2O \rightarrow CO_2 + H_2$$

Further oxidizer could be added to produce the reaction $H_2S + O_2$ $H_2O + SO_2$ which would prevent escape of HTS in the product gas. However in this example we shall assume any tritiated $H_2S$ can be removed from the product stream by conventional methods.

In the particular example of Gasbuggy, the ferric oxide in the rock will act as an oxidizer, liberating oxygen by thermal decompositon according to the reaction $$Fe_2O_3 \rightarrow FeO + O_2$$

In fact the oxygen derived from ferric oxide is more than enough to oxidize the iron in the device plus the iron liberated from iron sulfide to ferrous sulfide.

Thus in the Gasbuggy case to produce a sufficiently oxidizing environment enough oxidizer should be added (with 10 percent excess) to oxidize 143 tons of free carbon to carbon dioxide and 12 tons of iron to ferrous oxide.

To oxidize the carbon, 420 tons of oxygen is required, which might typically be supplied in the form of 1500 tons of manganese dioxide ore, assaying 75% $MnO_2$. An additional 25 tons of ore would be required to oxidize the iron.

This ore could be put in the device emplacement hole from one cavity radius above to one cavity radius below the device. The emplacement hole would have to be underreamed to a 12 foot I.D. in the cavity region. Alternatively the ore could be forced into rock fractures with a fluid as described above or a fluid oxidizer could be used.

Note that the foregoing indicates a maximum amount of oxidant additive required. If the melt is nearer 500 tons/kiloton than 1000 tons/kiloton (as is entirely possible) only about one-half as much oxidant would be required.

EXAMPLE 2 — Carbonate Rocks

This example presents a calculation for a detonation in a low reductant environment. Many petroliferous formations in the Southwest United States are adjacent to relatively pure, thick strata of dolomite [Mg Ca $(CO_3)_2$] or calcite ($CaCO_3$). The only major reductants affecting a detonation in this media are the emplacement hole casing (if any), the device canister and insulation on electrical cables.

Again consider the Gasbuggy device (26 kilotons) detonated in a cased hole in a carbonate media at a depth of about 5000 feet. At this depth, the total cost of the emplacement hole plus device is about the same for emplacement hole diameters in the range 14 to 24 inches ID. (F. E. Hill, pp 68 in "Symposium on Engineering with Nuclear Explosives"). Assume for this example a 24 inch ID casing 3/4 inch thick weighing about 0.1 tons/ft of iron and extending to one cavity radius below the shot point. The device contains about 1 ton of iron. The total weight of iron in a 80 foot radius cavity will be 17 tons. The plastic and paraffin in the cavity region will be at most ½ ton.

About two tons of $MnO_2$ ore per ton of iron and 25 tons of $MnO_2$ ore per ton of plastic are required for complete oxidation to FeO, $CO_2$ and $H_2O$. With a 10 percent excess about 50 tons of $MnO_2$ ore are required. This amount of ore could be placed in 180 feet of emplacement hole. Thus the oxidant would all be near the molten rock in the cavity with no underreaming required.

If $MnO_2$ were placed in an uncased 24 inch hole below the shot point, only 120 feet of $MnO_2$ would be required to produce an oxidizing atmosphere.

If no hole casing were required in the cavity region and chemically inert electrical insulation were used, The amount of MnO$_2$ ore required would drop to about 3 tons. The 3 tons could be held in less than 11 feet of 24 inch ID emplacement hole. In this case no extension of the emplacement hole below the detonation point would be required.

While there has been described in the foregoing what may be considered to be preferred embodiments of the invention, modifications may be made therein without departing from the concepts of the invention, and it is intended to cover all such as fall within the scope of the appended claims.

What we claim is:

1. A process for decreasing radioactive contamination of the atmosphere in a cavity and chimney formed by detonation of a nuclear explosive in a subterranean formation which contains an excess of chemical reductant materials therein comprising:
   a. providing passageway means from the surface extending to said formation, said passageway terminating in an emplacement cavity within said formation;
   b. emplacing a fission-fusion nuclear explosive device within said cavity;
   c. disposing a quantity of oxidant circumjacent said nuclear explosive device sufficient to oxidize the chemical reductant materials as well as reduced state radioactive contaminants formed in the detonation;
   d. stemming said passageway; and
   e. detonating said nuclear explosive device so that said oxidant provides an oxidizing environment in the vicinity of the detonated device adequate to oxidize volatile radioactive compounds and precursors of radioactive compounds including tritium created by the detonation to form non-volatile or condensible products therewith to minimize radioactive content of the atmosphere in the cavity and rubble chamber produced by the detonation.

2. A process as defined in claim 1 wherein said subterranean formation is a hydrocarbon bearing formation also in which said materials include materials selected from the group consisting of carbon, hydrogen deficient carbon compounds, metallic sulfides and metallic iron.

3. A process as defined in claim 2 wherein said oxidant is a material selected from the group consisting of oxygen, manganese dioxide, alkali and alkaline earth metal chlorates, perchlorates and nitrates, sulfates, sodium perborate and sodium peroxide.

4. A process as defined in claim 3 wherein components having reductant properties are used in emplacing said nuclear explosive device and wherein sufficient additional oxidant is emplaced in the vicinity thereof to oxidatively react therewith.

5. A process as defined in claim 3 wherein said subterranean formation is a natural gas bearing formation, wherein said natural gas enters the rubble chamber formed by said detonation, said gas having a decreased content of tritium and tritiated gaseous hydrocarbon compounds due to oxidation of the tritium by said oxidant, and wherein natural gas hydrocarbon is withdrawn from said rubble chamber to the surface for use and distribution.

6. A process as defined in claim 5 wherein the emplacement cavity in said formation is disposed in a formation stratum in close proximity to gaseous hydrocarbon bearing strata from which production is desired, said stratum having a low content of reductants therein wherefor the amount of oxidant required is decreased, and wherein the rubble chamber produced by the detonation interconnects as by means of formation fractures with the hydrocarbon bearing formation.

7. A process as defined in claim 6 wherein the quantity of oxidant is determined with reference to the reductant content of the melted zone formed by the detonation.

* * * * *